(No Model.) 2 Sheets—Sheet 1.

C. A. D'EBRO.
WATER MODULE OR DELIVERY REGULATOR.

No. 518,227. Patented Apr. 17, 1894.

Witnesses:
E. B. Bolton
A. S. Brising

Inventor:
Charles Abraham D'Ebro
By Richards & Co.
his Attorneys.

THE NATIONAL LITHOGRAPHING COMPANY,
WASHINGTON, D. C.

(No Model.) 2 Sheets—Sheet 2.
C. A. D'EBRO.
WATER MODULE OR DELIVERY REGULATOR.
No. 518,227. Patented Apr. 17, 1894.
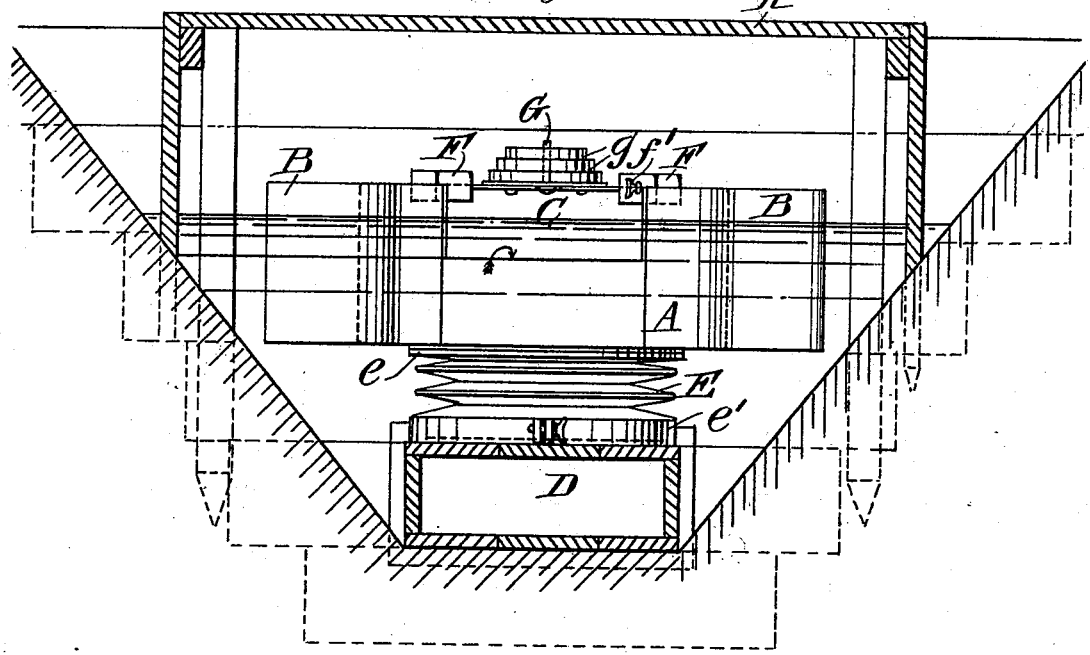
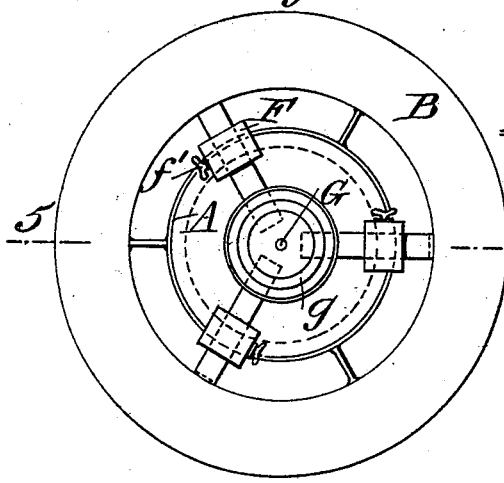
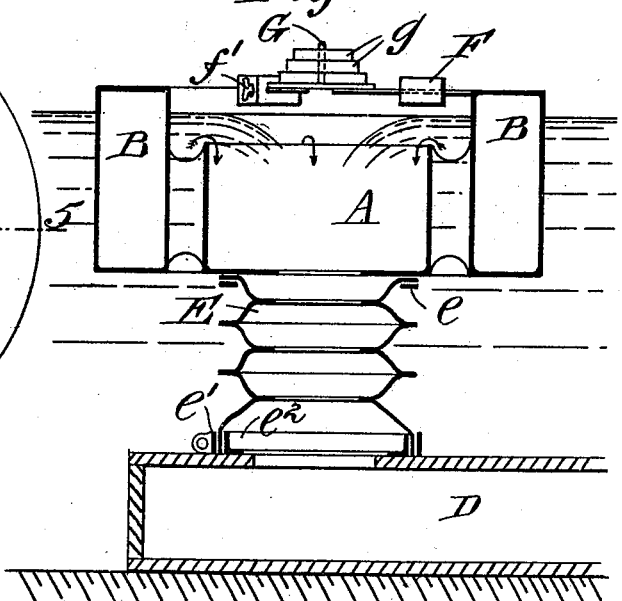
Witnesses:
E. B. Bolton
A. S. Busing
Inventor:
Charles Abraham D'Ebro
By Richards & Heo.
his Attorneys.

UNITED STATES PATENT OFFICE.

CHARLES ABRAHAM D'EBRO, OF MELBOURNE, VICTORIA.

WATER MODULE OR DELIVERY REGULATOR.

SPECIFICATION forming part of Letters Patent No. 518,227, dated April 17, 1894.

Application filed December 9, 1893. Serial No. 493,236. (No model.)

*To all whom it may concern:*

Be it known that I, CHARLES ABRAHAM D'EBRO, architect and civil engineer, a subject of the Queen of Great Britain and Ireland, and a resident of The Austral Chambers, 99 Queen Street, Melbourne, in the British Colony of Victoria, have invented an Improved Water Module or Delivery Regulator for Regulating the Delivery of Water from Water-Channels, of which the following is a specification.

This invention has been devised for the purpose of providing a simple and inexpensive yet efficient apparatus which will regulate the amount of water delivered from a water channel in a given time.

According to my invention, I provide a vessel having floats arranged to support it at a certain level in the water, so that a certain quantity of water will overflow into it in a given time according to the depth to which such vessel is submerged by means of weights. Said vessel is connected by an expansible tube or connection with a trunk or chamber for carrying off the water supplied to it, and is provided with a gate which can be closed when desired. The floating vessel above referred to is kept perfectly level by three adjustable weights sliding to and fro upon arms thereon. A wooden or other casing having a door secured by a padlock or otherwise may be fitted over the whole of the apparatus so as to prevent it being injured or tampered with.

Having now generally described and ascertained the nature of my said invention and in what manner the same is to be performed, I will proceed to more particularly describe the same with the aid of the accompanying drawings, wherein—

Figure 1:
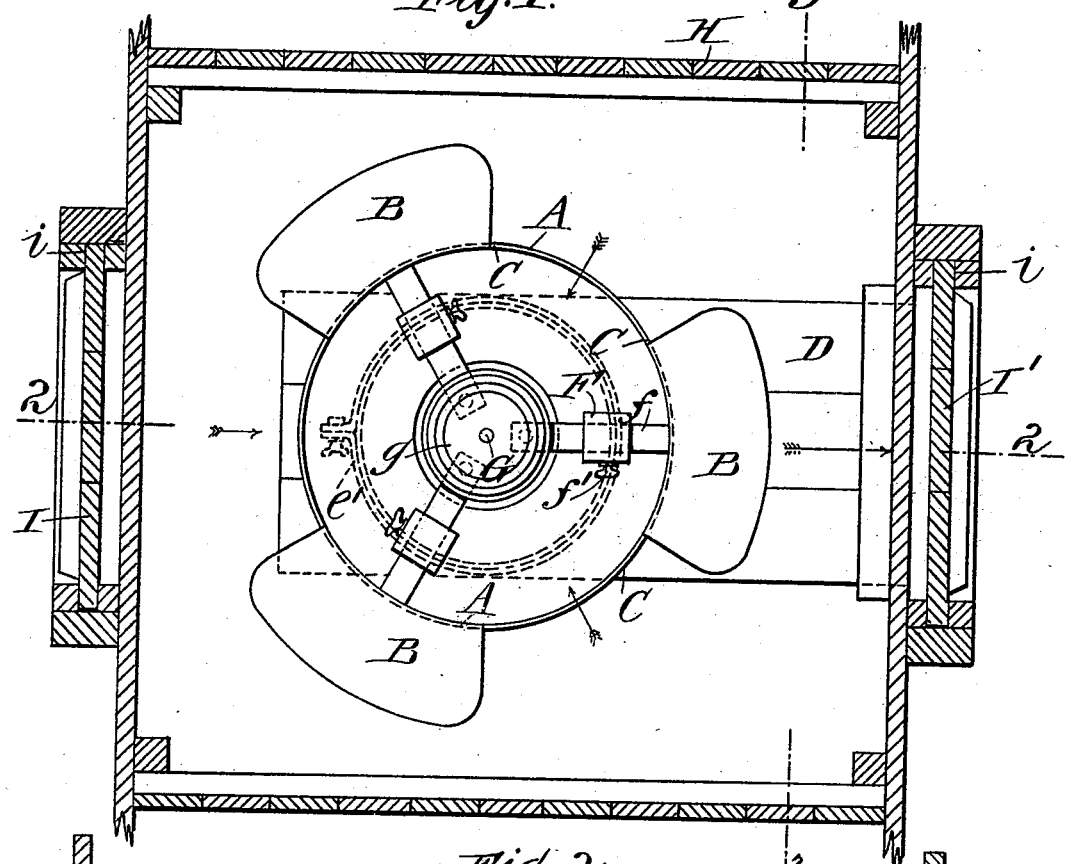
Figure 2:
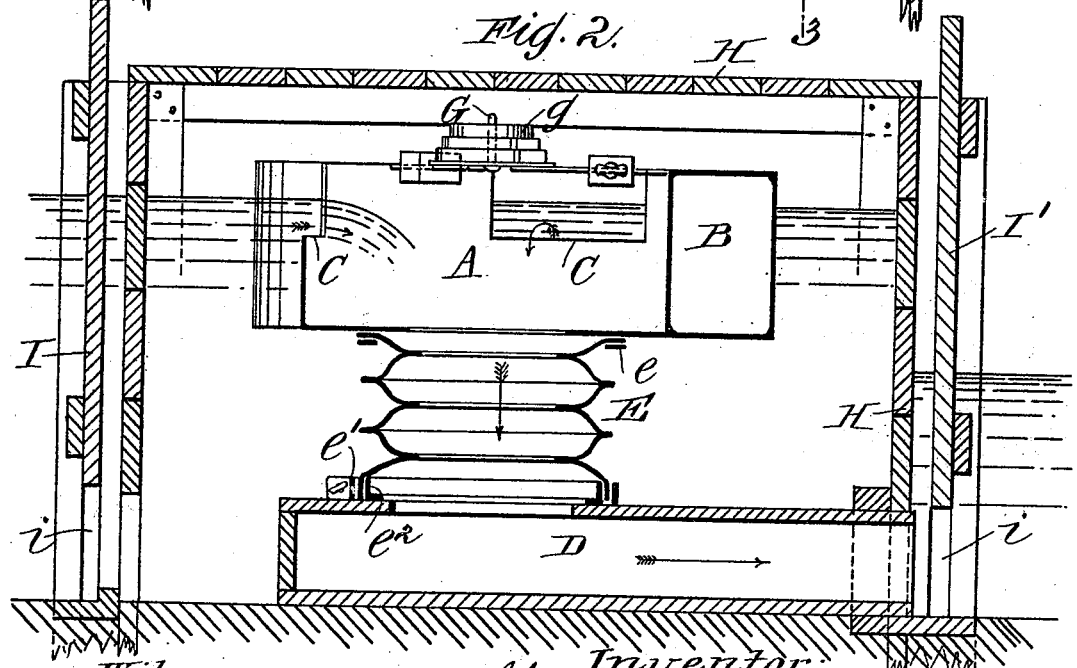

Figure 1 is a horizontal section through the casing surrounding a water module or delivery regulator constructed according to this invention, said module or regulator being shown in plan. Fig. 2 is a vertical central section on line 2—2, Fig. 1. Fig. 3 is a vertical transverse section on line 3—3, Fig. 1. Fig. 4 is a plan of a modified form of my invention, and Fig. 5 is a vertical central section on line 5—5, Fig. 4.

The same letters of reference indicate the same or corresponding parts in all the figures.

A represents a vessel which may be cylindrical, as illustrated in the drawings, or if preferred may be made triangular, rectangular or other convenient shape. It is provided with one or more floats B which are by preference made of sheet metal and three in number, and so arranged around said vessel as to support it at a certain level in the water. Notches or weirs C are cut around the edge of this vessel A, between the floats B, so as to form overflows for the water to pass from the channel or reservoir in which the apparatus is placed through such vessel, and down to the discharge trunk or chamber D, the vessel A being connected with said trunk by the expansible tube E formed of rings of flexible material joined together at their edges. The upper end of this expansible tube is secured to the under side of the vessel A by a metal ring $e$ screwed or otherwise fastened to said vessel, while a clamping ring $e'$ compresses the lower end of said tube around a flange or ring $e^2$ projecting up from the trunk D, as clearly illustrated in Fig. 2.

The floating vessel A is provided with three or more arms $f$, upon each of which is fitted a sliding weight F which may be clamped thereupon in any desired position by a set screw $f'$ so that it can be shifted nearer to or farther from the center of said floating vessel, and thus enable it to be adjusted until it is perfectly level.

G represents a pin which projects upwardly from the center of the floating vessel A for the purpose of receiving a number of weights $g$ by which the depth to which said vessel is sunk is determined, and by which the quantity of water flowing through it in a given time is repeated.

H represents the wooden or other casing which incloses the apparatus above described, said casing being provided with a door secured by a padlock or otherwise so as to prevent such apparatus from being injured or tampered with.

I—I' represent the inlet and outlet gates sliding in grooves $i$ at each end of the apparatus and whereby the water is admitted and shut off as required.

In the arrangements illustrated in Figs. 4 and 5, the float B is annular and is supported a short distance away from the side of the vessel A, in which case the water flows over the whole edge of the said vessel instead of over notches or weirs cut therein. In other respects, the construction and operation of this modification are exactly the same as that previously described.

With a module constructed as I have described, the discharge of water is determined by the weights $g$ quite irrespectively of the level of the water in the channel or reservoir from which the source is drawn.

Having now particularly described and ascertained the nature of my said invention and in what manner the same is to be performed, I declare that what I claim is—

1. In a water module or delivery regulator for regulating the delivery of water from water channels, a vessel provided with floats and having superimposed weights in combination with an expansible tube connecting said vessel with a discharge trunk or chamber, the said vessel surmounting the said expansible tube which expands and contracts vertically as the floating vessel rises or falls as set forth.

2. In a water module or delivery regulator for regulating the delivery of water from water channels a vessel provided with floats, and having super-imposed weights and radial arms, each supporting an adjustable balance weight in combination with an expansible tube connecting said vessel with a discharge trunk or chamber, as set forth.

3. In a water module or delivery regulator for regulating the delivery of water from water channels, a floating vessel having superimposed weights in combination with an expansible tubular connection clamped to said vessel at its upper end and to a discharge trunk or chamber at its lower end, the said vessel being free to rise and fall and expand and contract the expansible tube vertically, as set forth.

4. In a water module or delivery regulator the floating vessel fitted with floats and weights and adapted to receive the water flowing into its top part and the expansible tube connecting the bottom of said floating vessel with the discharge trunk, substantially as described.

5. In a water module or delivery regulator for regulating the delivery of water from water channels, a vessel provided with superimposed weights and connected to an annular float supported a short distance from said vessel, as set forth.

6. In a water module or delivery regulator, the floating vessel provided with floats and adapted to receive the water into its upper part and the expansible tube connecting said vessel with the discharge trunk, the said floats extending about the floating vessel and up above the level of the inlets for the water leading thereto, substantially as described.

In witness whereof I have hereunto set my hand in presence of two witnesses.

CHARLES ABRAHAM D'EBRO.

Witnesses:
EDWARD WATERS,
EDWARD NEEDHAM WATERS.